United States Patent
Malik

(10) Patent No.: US 6,788,027 B2
(45) Date of Patent: Sep. 7, 2004

(54) SYSTEM FOR CONTROLLING THE VOLTAGE OF AN ENERGY STORAGE DEVICE TO PREVENT PREMATURE AGING OF THE DEVICE

(75) Inventor: Manfred Malik, Penzberg (DE)

(73) Assignee: Continental ISAD Electronic Systems GmbH & Co., oHG, Landsberg (DE)

( * ) Notice: Subject to any disclaimer, the term of this patent is extended or adjusted under 35 U.S.C. 154(b) by 14 days.

(21) Appl. No.: 10/115,212

(22) Filed: Apr. 2, 2002

(65) Prior Publication Data

US 2002/0140405 A1 Oct. 3, 2002

(30) Foreign Application Priority Data

Apr. 3, 2001 (DE) .......................................... 101 16 463

(51) Int. Cl.$^7$ .................................................. H02J 7/00
(52) U.S. Cl. ..................................................... 320/134
(58) Field of Search ................................ 320/104, 166, 320/130, 136, 140, 144, 150, 153; 123/179.21, 179.3; 307/10.1, 10.6, 10.7, 48; 290/38 R, 22, 31, 50

(56) References Cited

U.S. PATENT DOCUMENTS

| 5,041,776 A | * | 8/1991 | Shirata et al. | ................. | 322/99 |
| 5,260,637 A | * | 11/1993 | Pizzi | .......................... | 320/103 |
| 5,488,283 A | * | 1/1996 | Dougherty et al. | ........ | 307/10.1 |
| 5,572,108 A | * | 11/1996 | Windes | ....................... | 320/167 |
| 6,202,615 B1 | * | 3/2001 | Pels et al. | ................. | 123/179.3 |
| 6,242,887 B1 | * | 6/2001 | Burke | ......................... | 320/104 |
| 6,481,406 B2 | | 11/2002 | Pels | .......................... | 123/179.3 |

FOREIGN PATENT DOCUMENTS

DE 198408919 C1 8/2000

OTHER PUBLICATIONS

Dietrich, Thomas: "Condenser Power for Innovative Applications", Elektronik, Heft 09/99, pp. 72–77 (w/English translation of relevant parts).

* cited by examiner

Primary Examiner—Pia Tibbits
(74) Attorney, Agent, or Firm—Marshall, Gerstein & Borun LLP

(57) ABSTRACT

Systems and methods are disclosed to store electrical energy in, for example, a vehicle. In an example system, a storage module is provided including one or more capacitors, a sensor to measure the temperature of the capacitor(s), and a control device that controls the voltage at the capacitor(s) so that the maximum voltage at the storage module and/or the individual capacitor(s) increases as the temperature decreases. The aging of the capacitor(s) and in particular electrochemical capacitors strongly depends on the temperature in addition to the operating voltage. Controlling the capacitor voltage based on temperature can, therefore, substantially reduce the aging of the capacitor(s).

5 Claims, 5 Drawing Sheets

SYSTEM FOR CONTROLLING THE VOLTAGE OF AN ENERGY STORAGE DEVICE TO PREVENT PREMATURE AGING OF THE DEVICE

FIELD OF THE INVENTION

The present invention relates generally to energy storage and, more particularly, to methods and apparatus for storing electrical energy (e.g., in a vehicle), in a manner that maximizes the useful life of the storage capacitors.

BACKGROUND OF THE INVENTION

In order to store electrical energy (e.g., in electric vehicles, hybrid vehicles, etc.), capacitor storage device are presently used as well as rechargeable electrochemical storage devices. The selected storage medium depends on the respective requirements of the energy storage. Electrochemical storage devices such as nickel cadmium batteries, nickel metal hydride batteries, lead acid batteries or lithium batteries are particularly suitable as long-term storage devices due to their high specific storage capacity (energy density). "Long-term storage devices" are to be understood as energy storage devices that can store large amounts of energy but in comparison have a relatively low output. For uses that require a high output over short periods, capacitors are preferably used as "short-term storage devices" such as electrolyte or ceramic capacitors. Since the charge carriers are stored in a purely physical matter (electrostatically) in the capacitors, the stored energy can be released within $10^{-3}$ to $10^{-5}$ s. At up to 100,000 W/kg, the power density is hence approximately 100 times greater than electrochemical storage media. As a trade-off, capacitor storage devices have substantially lower specific storage capacity than electrochemical storage devices.

For many applications, it is especially useful to combine an electrochemical storage device that has a high energy density with a capacitor storage device that has a high power density. DE 198 40 819 discloses, for example, the use of high power capacitors for a short-term storage device in a vehicle that delivers all or part of the starting energy to the starter upon starting the internal combustion engine. The short-term storage device is charged as a preparation for starting by drawing power from an electrochemical battery. In this manner, the battery can quickly release energy stored over a long period to the starter and start the internal combustion engine even when the power offered by the battery is insufficient.

For a few years, a new generation of capacitors has been available that are termed "electrochemical capacitors," "double-layer capacitors," or "super capacitors." Such capacitors include two porous electrodes, usually made of active charcoal, with a very high internal surface of up to 10,000 m²/g. The electrodes are saturated with an electrolyte. When a voltage is applied, the ions of the electrolyte collect on the electrodes. An electrical double-layer or boundary layer forms that includes a layer of electron charges in the solid, and a neighboring layer of ion charges in the electrolyte. The water bound to the ions, for example, functions as a dielectric so that the spacing of the "capacitor plates" equals the diameter of the water molecules. Given this extremely small spacing between the charge layers and large surface of the active charcoal electrodes, we obtain extremely high capacitances of approximately 200 F/g (see L. F. Trueb, P. Rüetschi: "Batterien und Akumulatoren— Mobile Energiequellen für heute und morgen" (Batteries and Accumulators—Mobile Energy Sources for Today and Tomorrow), Springer-Verlag: Berlin 1998). Double-layer capacitors are commercially available under the name of "UltraCap" by Siemens Matsushita, or "GoldCap" by Panasonic.

The capacitance of the double-layer capacitor can be further increased when a fast, reversible redox reaction also occurs at the electrode surface. In such a case, the double-layer capacitance is added to the chemical or Faraday or pseudocapacitance. For the electrodes, ruthenium or iridium oxide can be used, for example, that changes back and forth very easily and reversibly between oxidation states +3 to +4 during charging and discharging. Thanks to the redox reaction, the charge of such a metal oxide capacitor (also termed a Faraday capacitor) stored on the electrode surface is extremely high. The charging and discharging procedures are slower than with electrostatic capacitors, however they are much faster than purely electrochemical storage devices.

Double-layer and Faraday capacitors have a much higher energy density than conventional capacitors and are, therefore, particularly well suited to use as short-term storage devices. The charging and discharging time is approximately 0.3 to 30 seconds, and the energy can be stored over a few days to weeks (see Thomas Dietrich, "Kondensator-Power fur innovative Applikationen," (Capacitor Power for Innovative Applications), Elektronik, Vol. 9/99, p. 72–77).

The useful life of electrochemical capacitors is usually cited as being approximately 10 years. In practice, however, this life is rarely attained. The electrochemical capacitors can only be operated at relatively low voltages. At higher voltages, electrochemical decomposition (electrolysis) of the electrolyte starts, which leads to the irreversible destruction of the capacitor. With capacitors that have an aqueous electrolyte, $H_2$ and $O_2$ arise, whereas, for example, carbon dioxide arises in the electrolysis of organic electrolytes. The gas pressure that this causes expands the housing and increases the internal resistance of the capacitor. When used in a vehicle, the life of a double-layer or Faraday capacitor is therefore limited to approximately one year.

BRIEF DESCRIPTION OF THE DRAWINGS

Corresponding parts have the same reference numbers throughout the figures.

BRIEF DESCRIPTION OF THE PREFERRED EXAMPLES

Figure 1:
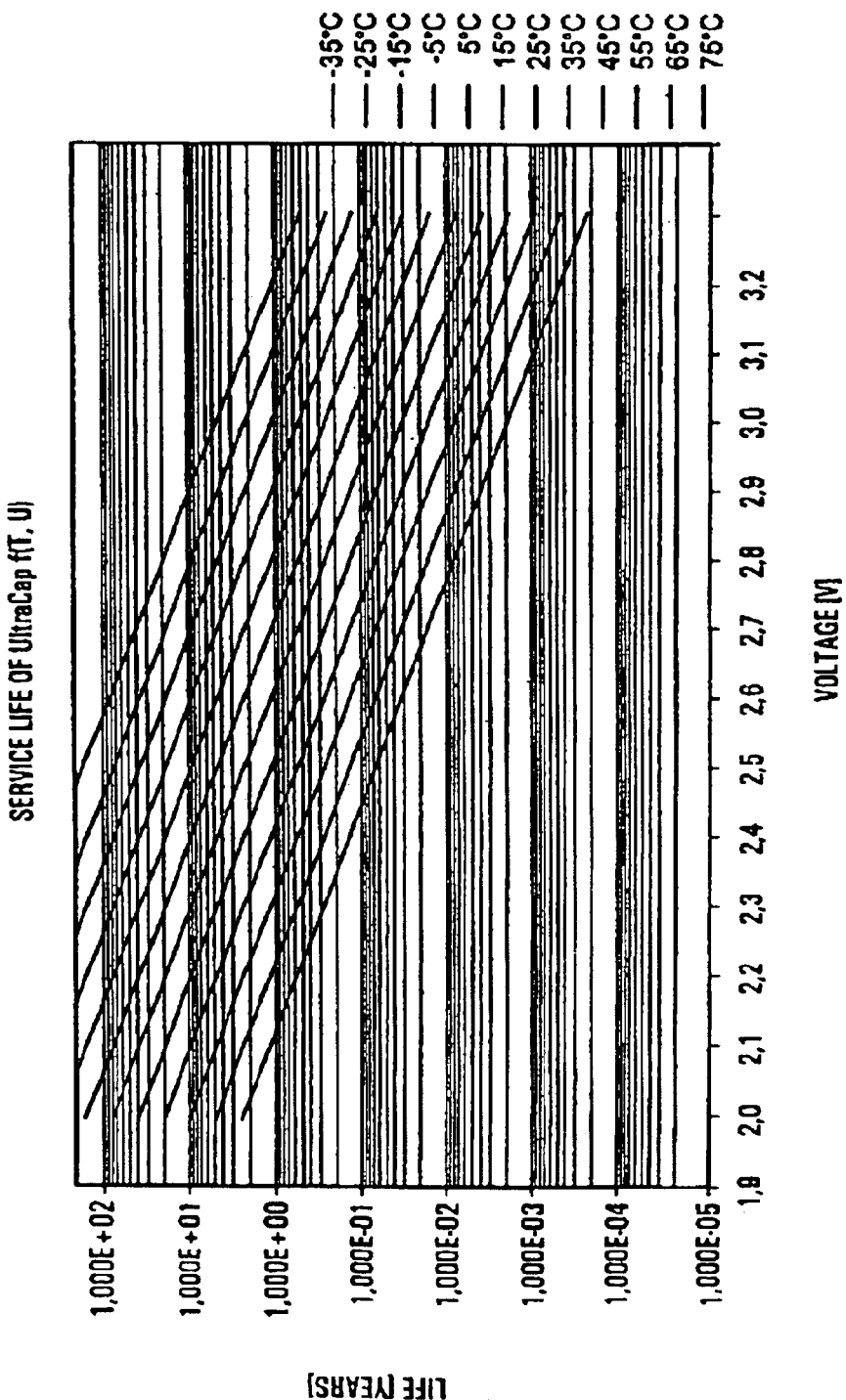
FIG. 1 is a diagram of the life of an electrochemical capacitor as a function of voltage at various temperatures.

FIG. 1 illustrates the relationship of the life of a double-layer capacitor (UltraCap in this instance) to the operating voltage at various operating temperatures. (Each of the graphed lines corresponds to a respective temperature shown on the right of the graph.) The normal operating range of an UltraCap is 0 to 2.3 V at permissible operating temperatures of −35 to +75° C. The manufacturer states that the normal life is 10 years. However, FIG. 1 shows that this life can be attained at an operating voltage of 2.3 V only when the operating temperature is below 26° C. At a temperature of 75° C., only a life of 2.5 months can be expected. On the other hand, we can see that the given operating voltage of 2.3 V can be exceeded at low temperatures without causing the capacitor to experience premature aging. For example, an UltraCap can be charged to 2.8 V at −25° C. without falling below the projected life of 10 years, whereas it can only be charged to 2.0 V at 55° C. to achieve a life of 10 years.

Figure 2A:
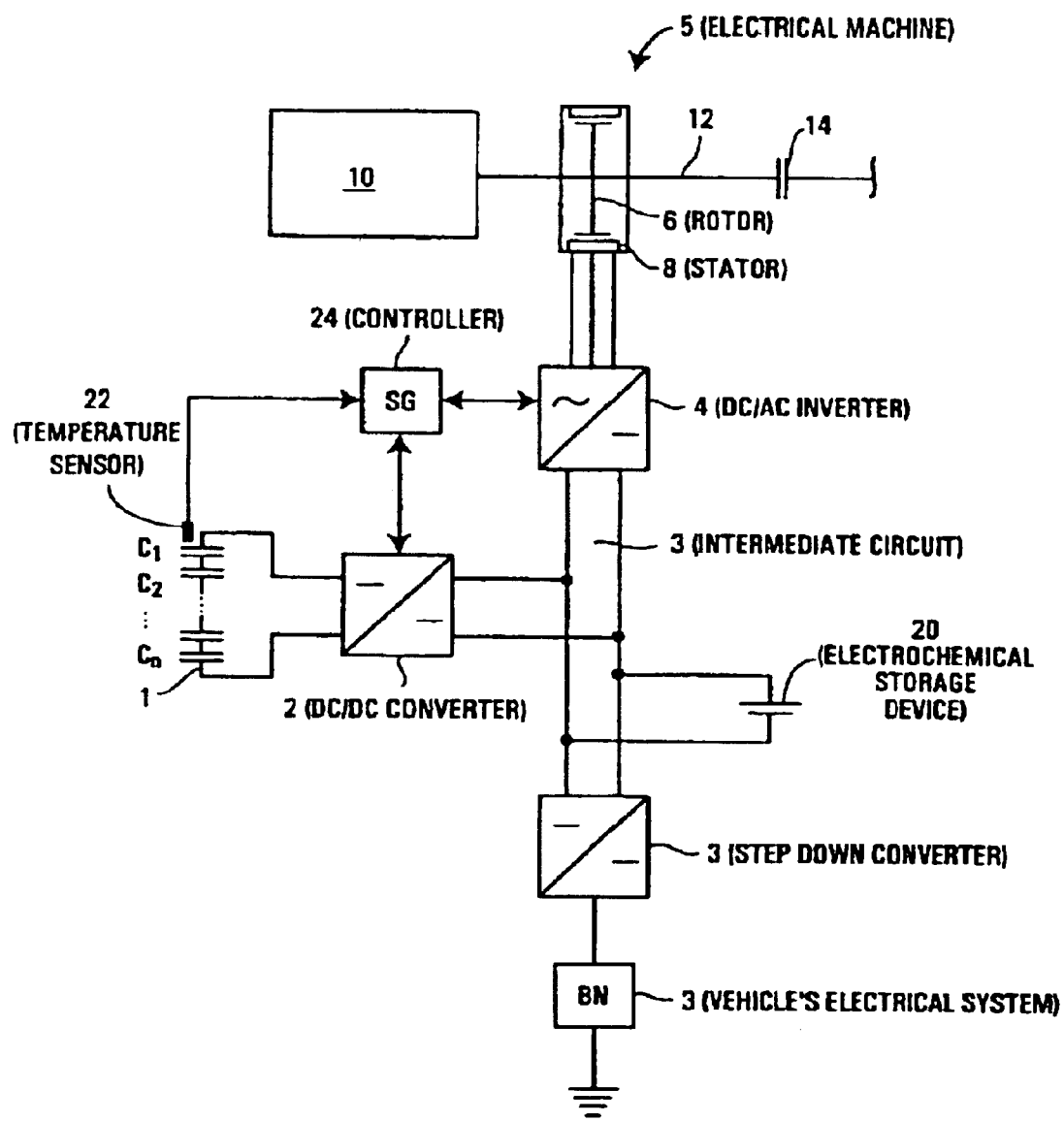
FIG. 2a is a schematic representation of a first exemplary energy storage system in a vehicle.

The energy storage system in FIG. 2a is for a vehicle (for example, a passenger car). A storage module 1 comprises N number of series-connected capacitor storage devices $C_1$, $C_2$, ... $C_N$. The storage module 1 is connected via a DC/DC converter 2 to an intermediate circuit 3. The charging voltage for the storage module 1 can be freely set by the DC/DC converter 2. In addition, it serves to raise or lower the energy drawn from the storage module 1 to the voltage level of the intermediate circuit 3 when the capacitors $C_1$, $C_2$, ... $C_N$ are discharged. It is, therefore, designed as a bidirectional converter.

An electrical machine 5 (asynchronous three-phase machine in this instance) serving as a generator is connected to the intermediate circuit via an inverter (d.c./a.c. inverter 4). This machine 5 is driven by an internal combustion engine 10 that provides torque via a drive shaft 12, a clutch 14, and other parts of a drive train (not shown) to the drive wheels of the vehicle. The electrical machine 5 has a coaxial rotor 6 directly seated on the drive shaft 12, as well as a stator 8 (e.g., abutting the housing of the internal combustion engine 10). The winding of the stator 6 is fed electrical current and voltage with a freely settable amplitude, phase, and frequency by the converter 4. In the example shown here, the electrical machine 5 simultaneously serves as a starter. In other examples, the starter and generator are separate. The electrical machine 5 is preferably also used for regenerative braking where the braking energy of the vehicle is converted into electrical energy by the electrical machine 5 operating as a generator. When operating as a motor, the electrical machine 5 can also help drive the vehicle.

In the intermediate circuit, there is also a step down converter 16 that is coupled to the vehicle's electrical system 18. The electrical system 18 is advantageously at a voltage level of, for example, 12 or 24 V. The intermediate circuit 3 is contrastingly at a higher voltage of, for example, 42 V. An electrochemical storage device 20 (e.g., a sulfuric acid/lead battery) is also connected to the intermediate circuit 3. When the internal combustion engine 10 is not running, the electrochemical storage device 20 supplies the consumers of the vehicle's electrical system 18, and when the internal combustion engine 10 is running, the electrical machine 5 serves as a generator to charge the electrochemical storage device 20 and the storage module 1, and to supply the vehicle's electrical system 18.

On or close to the storage module 1 is a temperature sensor 22 that measures the momentary temperature of the capacitor storage device $C_1$, $C_2$, ... $C_N$. The temperature sensor 22 has, for example, a sensor element with electrical resistance material with positive or negative temperature coefficients (PTC or NTC) in heat-conducting contact with one or more capacitor storage devices of the storage module 1. A controller 24 receives the temperature-related information supplied by the temperature sensor 22, uses the relationship shown below in FIG. 3 to calculate the maximum permissible charging voltage at which the accelerated aging of the capacitor storage device is avoided, and correspondingly signals the DC—DC converter 2 not to feed the storage module 1 with a higher voltage. The controller 24 also controls the inverter 4 by signaling it the amplitude, phase and frequency of the three-phase current to be sent to the electrical machine 5. Information signals can be received from an angular rotation transmitter (not shown) from which it can calculate the normal angular position and speed of the drive shaft 12. This allows the controller 24 to set not only the maximum permissible charge voltage for the storage module, but also ensure that the storage module 1 is returned to an operating voltage that varies with the temperature each time it is fed or discharges energy. If energy is drawn from the storage module 1, such as for starting or accelerating, the controller 24 then signals the inverter 4 that the electrical machine 5 is to be operated as a generator and to store the generated energy in the intermediate circuit 3 from where the energy is fed via the DC—DC converter 2 to the storage module 1. If the storage module 1 has absorbed recuperated braking energy, this energy is then slowly returned via the DC—DC converter 2 into the intermediate circuit 3 and fed into the electrochemical storage device 20, or used for loads.

Figure 2B:
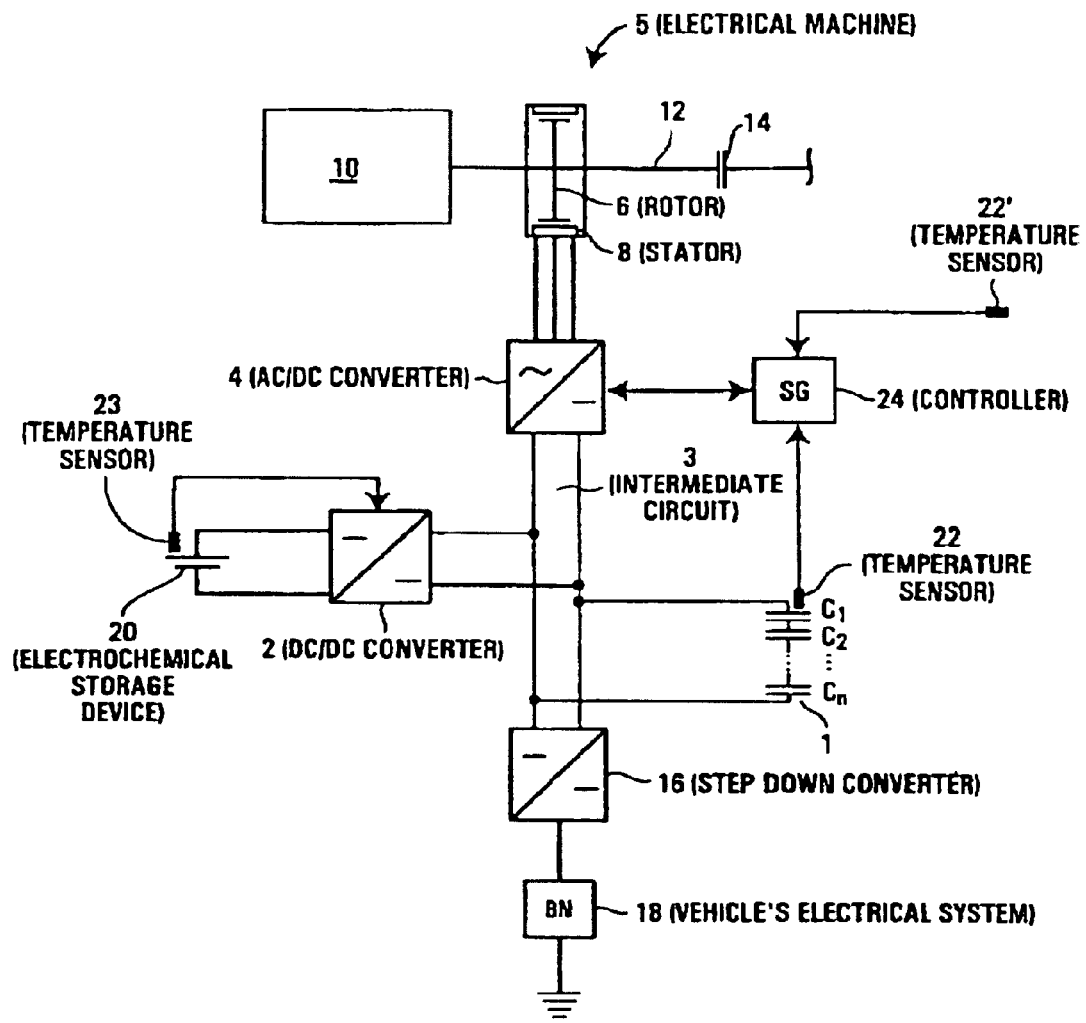
FIG. 2b is a schematic representation of a second exemplary energy storage system in a vehicle.

The example shown in FIG. 2b largely corresponds to that shown in FIG. 2a. To avoid repetition, when the parts are the same, like numbers are used and the description of those parts will not be repeated. The most notable difference is that in FIG. 2b, the storage module 1 is directly incorporated within the intermediate circuit 3, while the electrochemical storage device 20 is connected via a DC—DC converter 2 to the intermediate circuit 3. The DC/DC converter is hence not controlled by the controller 24, but is set by the sensor 23 depending on the temperature measured at the electrochemical storage device 20. The current drawn from the storage device 20 can be actively set. For example, at low temperatures, only a low discharge current is permitted to prevent the battery from failing in a cold start.

In addition, the controller 24 receives temperature-related information from more than just the sensor 22 on the capacitor storage device. Another temperature sensor 22' also measures the environmental temperature $T_{ambient}$. When calculating maximum permissible voltage and/or operating voltage in this example, the controller also uses the maximum environmental temperatures from the last 1–3 days as anticipated values for the future maximum environmental temperature. Particularly when the vehicle is not running, this further protects the capacitor storage device from temperature-related aging.

Figure 3:
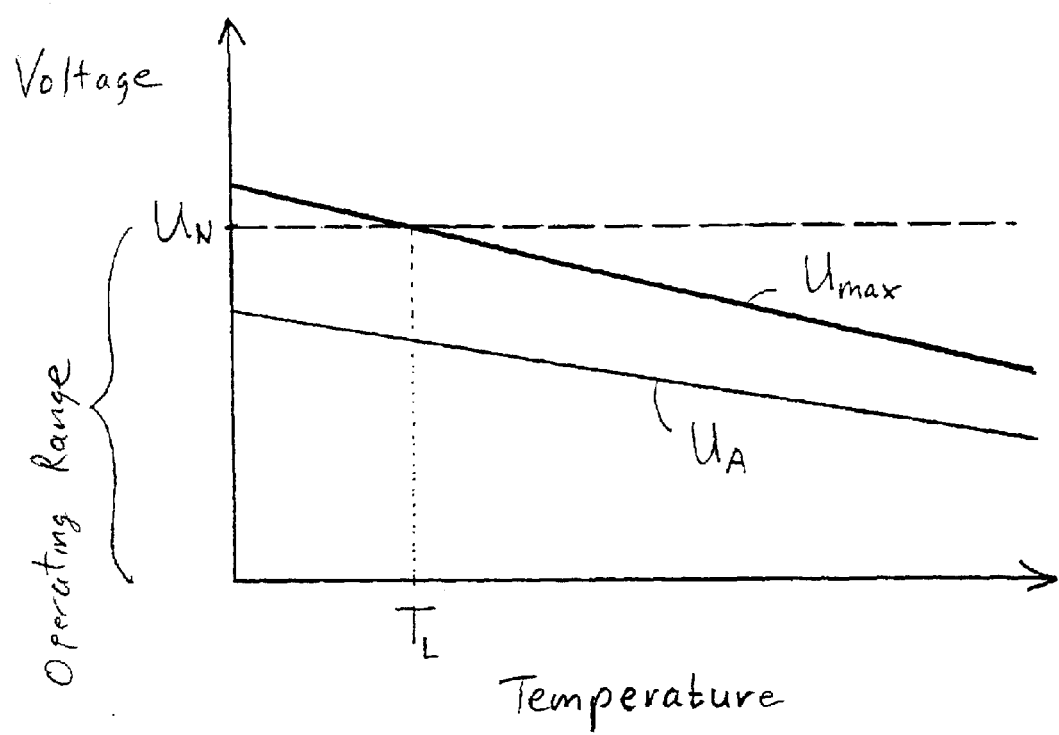
FIG. 3 is a graph of an example operating voltage and an example maximum voltage in relationship to the capacitor temperature.

FIG. 3 shows an example of the temperature dependence of the maximum charge voltage $U_{max}$ and the operating voltage $U_A$ of a storage module 1 as, for example, signaled to the DC—DC converter 2 by the controller 24. The range of operating voltage cited by the manufacturer is between 0 and $U_N$ (e.g., between 0 and 2.3 for each capacitor storage device). For a storage module including series-connected capacitor storage devices, $U_N$ is attained by multiplying the maximum voltage of a capacitor with the number of series-connected capacitors. In FIG. 3, $U_N$ is shown with a dashed line. The maximum permissible voltage $U_{max}$ set by the controller 24 decreases in this example, linearly as the temperature rises. $U_{max}$ lies within the working range at the average and high temperatures. At temperatures below $T_L$, voltages higher than $U_N$ are also permitted. $T_L$ in this example is 0° C. The operating voltage $U_A$ set by the controller 24 is approximately two-thirds of the maximum permissible voltage $U_{max}$ at all temperatures. $U_A$, therefore, also decreases linearly as the temperature rises in this example.

Figure 4:
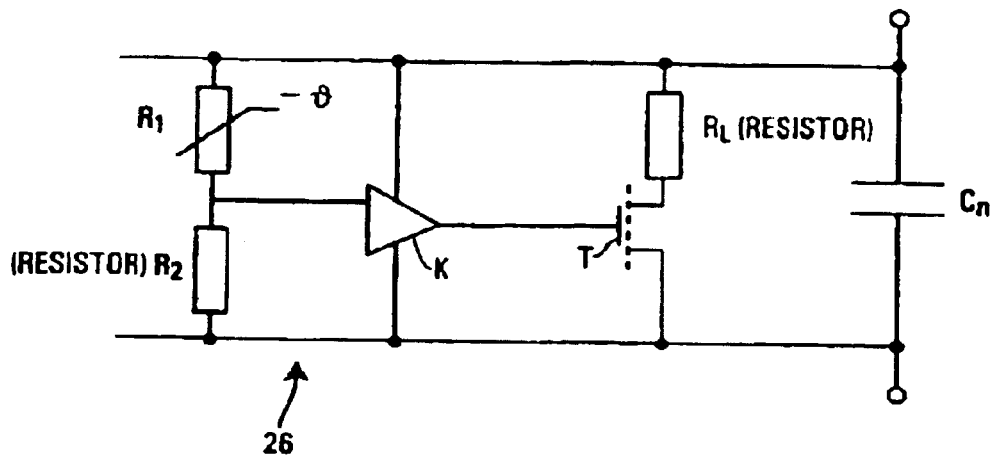
FIG. 4 is a block diagram of a first exemplary balancing circuit.
Figure 5:
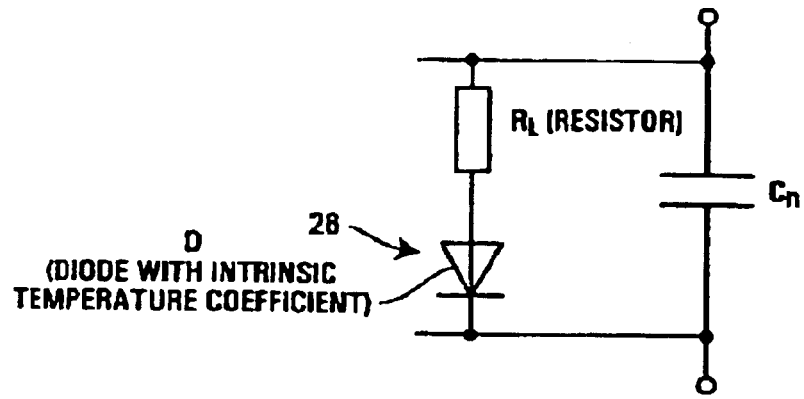
FIG. 5 is a block diagram of a second exemplary balancing circuit.

FIGS. 4 and 5 are examples of temperature-dependent balancing circuits. The balancing circuit monitors the voltage of each capacitor storage device $C_1, C_2, \ldots C_N$ and discharges it to the permissible value via a parallel-connected load resistor $R_L$ when a predetermined voltage or temperature is exceeded. FIGS. 4 and 5 show an individual capacitor $C_N$ of the series-connected capacitors $C_1, C_2, \ldots C_N$ of the storage module 1. Parallel to $C_N$, a load resistor $R_L$ can be switched via a temperature-dependent switching elements 26. In the circuit shown in FIG. 4, this switching element 26 comprises a transistor T (e.g., a bipolar transistor, or a field effect transistor, such as a MOSFET). The gate of the transistor T is connected to the output of a comparator K that compares the voltages at two resistors $R_1$, and $R_2$. One of these resistors $R_1$ is a thermistor or an NTC resistor whose resistance decreases as the temperature rises. At low temperatures, $R_1$ is greater than $R_2$, and the transistor T is in the off-state region so that the capacitor storage device $C_N$ is not discharge via $R_L$. As the temperature increases, however, the resistance of $R_1$ decreases and falls below the resistance of $R_2$ at a set temperature. The comparator then switches its output voltage. This causes the channel between the drain and source of the transistor to become conductive. When a specific temperature is exceeded, the load resistor $R_L$ is connected via the transistor T, and the capacitor storage device $C_N$ is at least partially discharged. This prevents the capacitor storage device $C_N$ from prematurely aging at a high temperature and simultaneously being supplied with voltage.

The circuit in FIG. 5 has a similar function. In this instance, the temperature-dependent switching element 26 is a single diode D with an intrinsic temperature coefficient instead of a transistor, comparator, and thermistor. The diode D is in a blocking state at low temperatures so that the capacitor storage device $C_N$ is not discharged via the load resistor $R_L$. When a set temperature is exceeded, the diode D conducts so that the capacitor storage device $C_N$ is discharged to the permissible value which accordingly prevents the capacitor from premature aging.

Persons of ordinary skill in the art will appreciate that a system has been disclosed for storing electrical energy using capacitor storage devices where the capacitor storage device can be operated at very high voltages and still have the desired life.

The disclosed system stores electrical energy in, for example, a vehicle, with a storage module 1 including one or more capacitor storage devices $C_1 \ldots C_N$. The system also has a device 22, 22', 23 for measuring the temperature of the capacitor $C_1 \ldots C_N$ or its direct environment, as well as one or more control devices 24 that control the voltage applied to the capacitor storage devices $C_1 \ldots C_N$ so that the maximum voltage applied to the storage module 1 and/or the individual capacitor storage devices $C_1, C_2 \ldots C_N$ increases as temperature falls.

"Capacitor" and "capacitor storage devices" are understood in this document to include all types of capacitors (i.e., electrolyte and ceramic capacitors) including electrochemical capacitors such as double-layer or Faraday capacitors.

The age of capacitor storage devices and especially electrochemical capacitors is strongly influenced by temperature in addition to operating voltage. The above cited decomposition of the electrolyte at a high voltage is accelerated at high temperatures. For this reason, the working range of the operating voltage cited by manufacturers (e.g., 0 to 2.3 V for an UltraCap), is only a reference for the actual voltage range within which the capacitor storage device can be operated without causing notable aging. Whereas at high temperatures the electrolyte starts to decompose at voltages within the given working range (e.g., at 2.1 V), the capacitor can be charged at lower temperatures, even at a higher voltage (e.g., up to 3 V), in certain circumstances. The disclosed temperature-dependant control systems control the capacitor voltage by one or more controllers 24 that advantageously regulate the maximum voltage applied to the storage module 1 or the individual capacitor storage devices $C_1, C_2 \ldots C_N$ so that the aging of the capacitor storage devices $C_1, C_2 \ldots C_N$ is kept very low.

The capacitor storage device(s) $C_1, C_2 \ldots C_N$ are preferably electrochemical capacitors such as double-layer capacitors or mixed forms of double-layer capacitors and chemical storage devices such as Faraday capacitors. These capacitor storage devices are distinguished by a particularly high capacitance, but they are strongly affected by the problem of premature aging due to electrolyte decomposition.

According to one example, the charge voltage of the storage module 1 comprises the capacitor storage devices $C_1, C_2 \ldots C_N$ is adjusted by an electronic power unit (e.g., a DC/DC converter) 2. The temperature measured at the capacitor storage devices $C_1, C_2 \ldots C_N$ is fed to a two-way control device 24 that signals the electronic power unit 2 the maximum charge voltage (which increases as temperature falls). The charge voltage of the capacitor storage device $C_1$, $C_2 \ldots C_N$ is hence limited to a specific, temperature-related value that is preferably slightly lower than the decomposition voltage at the respective temperature. This measure allows the capacitor storage device $C_1, C_2 \ldots C_N$ to be operated at a very high voltage, simultaneously prevents premature aging of the capacitor storage device from decomposition of the electrolyte and hence allows it to reach the desired service life. Since the energy $E=\frac{1}{2} C V^2$ stored in the capacitor is a function of the square of the charge voltage (V), it is advantageous to charge the capacitors $C_1$, $C_2 \ldots C_N$ to the highest voltage so that a high amount of energy can be tapped later.

In addition to the storage module 1 used for short-term storage, the energy storage system preferably has a long-term storage device 20 such as an electrochemical storage device. This device 20 can, for example, be a sulfuric acid/lead battery. By combining short-term and long-term storage devices, the energy storage system can be optimally adapted to the energy requirements of the respective application. The electrochemical storage device 20 can save a large amount of energy over a long period and cover the "basic load," whereas the capacitor storage devices $C_1$, $C_2 \ldots C_N$ can briefly provided high output for peak demand. It is particularly useful to use energy storage systems including a combination of long-term and short-term storage devices in vehicles since, for example, a much higher electrical output is briefly required while starting an internal combustion engine than during normal travel. In electrical or hybrid vehicles, the short-term storage device can also be used to provide energy to accelerate the vehicle and/or to store the energy recovered from regenerative braking. The electrochemical storage device 20 therefore, need only be dimensioned for normal driving.

When the disclosed energy storage system is used in combination with an electrochemical storage device 20, the converse temperature behavior of electrochemical storage devices and capacitor storage devices is particularly advantageous. Whereas the internal resistance of, for example, a sulfuric acid/lead battery 20 rises as temperature increases which strongly limits the drawable power, a capacitor storage device $C_1, C_2 \ldots C_N$ can be charged to a higher voltage at lower temperatures than otherwise possible, which increases the output and with drawable energy. These two converse effects can balance each other to a certain degree. This feature can be used to particular advantage when cold starting an internal combustion engine. At low temperatures, the internal combustion engine causes the starter to experience a substantial amount of torque from the very high shearing force of the motor oil. If the starting energy is drawn from an electrochemical storage device 20, the electrochemical storage device 20 often fails at low temperatures. If the starting energy is contrastingly made available from a capacitor storage device 1, even higher discharge current is available at low temperatures since the capacitor storage device 1 (without reducing its service life) can be charged to a higher voltage then at hot temperatures (e.g., up to 3 V in the case of a cold start). The capacitor storage devices $C_1, C_2 \ldots C_N$ are preferably charged before starting by drawing energy from the electrochemical storage device 20. Since the capacitor storage device $C_1, C_2 \ldots C_N$ take longer to charge than is permissible for the starting procedure, the capacitor storage devices $C_1, C_2 \ldots C_N$ can also be charged from an electrochemical storage device 20 that has low output due to the low temperature.

The electrical energy to charge the storage module 1 including the capacitor storage devices $C_1, C_2 \ldots C_N$ and/or the energy to charge the long-term storage device is preferably supplied by a generator 5 that is driven by an internal combustion engine 10. It is particularly advantageous for the generator 5 to be a three-phase machine where the voltage generated by the generator 5 is fed via a rectifier 4 into an intermediate circuit 3. The electrochemical storage device 20 and storage module 1 advantageously include capacitor storage devices $C_1, C_2 \ldots C_N$ that are also connected to this intermediate circuit 3 that, for example, has a voltage level of 40–350 V. Since the various consumers within a vehicle generally operate at low voltages, a low voltage section of the vehicle electrical system is advantageously provided that has a lower voltage than the intermediate circuit.

The generator 5 is preferably a crankshaft starter generator. This is an electrical machine 5 that functions both as a starter as well as a generator and is seated concentrically on the crankshaft of an internal combustion engine, and is preferably fixed to rotate with this shaft without intermediate transmission.

The double-layer capacitors are usually series-connected in a storage module 1 so that current can be supplied at a higher voltage then the operating voltage of the individual cells.

According to another preferred example, the voltage differences between individual series-connected capacitor storage devices $C_1, C_2 \ldots C_N$ of the storage module 1 are compensated by a balancing circuit whereby a load resistor $R_L$ can be switched parallel to each capacitor storage device $C_1, C_2 \ldots C_N$ which allows the corresponding capacitor storage device to be at least partially discharged. Such a balancing circuit is also termed "cell balancing" and serves to prevent voltage differences from arising between the individual capacitors $C_1, C_2 \ldots C_N$ due to variations in capacitance. Since capacitance and voltage are inversely proportional, the greatest voltage in a series connection of differently sized capacitors is present at the capacitor with the smallest capacitance which hence undergoes the strongest aging from the electrolyte decomposition. Therefore, same-size load resistors $R_L$ are parallel connected to each capacitor storage device via which the capacitor storage devices can discharge to a uniform voltage level and hence prevent uneven loading of the capacitor storage devices.

It is particularly preferable for the load resistors $R_L$ of the balancing circuit to be switched by a temperature-sensitive switching element 26 when a specific temperature is exceeded. The temperature-sensitive switching element 26 is preferably implemented by an NTC (negative temperature coefficient) thermistor or NTC resistor, or a temperature-sensitive diode that conducts when a specific temperature is exceeded. This measure automatically lowers the voltage at each capacitor storage device $C_1, C_2 \ldots C_N$ when the temperature is high. The balancing circuit hence functions like a fuse that protects the capacitor storage devices $C_1, C_2 \ldots C_N$ from higher voltage at high temperatures and hence from faster aging. The balancing circuit is preferably always active so that it can compensate for a sudden temperature rise when the motor is shut off. If, for example, the capacitor storage devices $C_1, C_2 \ldots C_N$ in a storage module 1 of a vehicle were charged to a higher voltage on a cool morning and the temperature in the parked car rises during the day, the condensers $C_1, C_2 \ldots C_N$ are automatically discharged by the balancing circuit until the capacitor storage devices are at a voltage level where they no longer age quickly.

A control unit 24 is preferably fed an average operating voltage calculated according to the desired life of the capacitor storage devices $C_1, C_2 \ldots C_N$, and the control unit 24 controls the power electronic functional unit 2 that sets the charge voltage for the storage module 1 and/or the generator 5 so that the voltage of the storage module 1 is returned to the operating voltage each time it is fed or releases energy. The operating voltage is advantageously selected such that the storage module 1 functioning as a short-term storage unit can release the power (e.g., necessary to accelerate a vehicle), or it can briefly draw energy (e.g., generated from regenerative braking). Each time the storage module 1 draws or releases energy in this manner, the voltage of the storage module 1 is (e.g., returned to the operating voltage by releasing energy to an electrochemical storage device 20 or by increasing the generator output). In this manner, the storage module 1 is always available for short-term energy absorption or discharge, and the generator 5 and electrochemical storage device 20 balance the discharged and absorbed energy over the long-term. The average operating voltage is preferably selected so that a capacitor storage device charged with this average voltage achieves, on the balance, the predetermined intended service life. Depending on the use, a high operating voltage can be preset at which the storage module 1 can discharge a high amount of power with a resulting shorter service life, or vice versa.

It is particularly preferable when the operating voltage is adapted in relation to the temperature of the capacitor storage devices $C_1, C_2 \ldots C_N$ so that the operating voltage increases as the temperature decreases. This makes it easier to achieve the predetermined service life than if a non-temperature-dependent operating voltage was set, since the aging of the capacitor storage devices (especially electrochemical capacitors) strongly depends on temperature in addition to voltage. The operating voltage is, therefore, advantageously set by the control device so that the voltage of the capacitor storage device can move within a range that causes slow aging at every temperature.

It is advantageous when the operating voltage is also related to the momentary speed of the vehicle since the probability of the discharge or absorption of energy is different at various driving speeds. At a higher speed (for example, greater than 20 km/h), braking is more probable so that the storage module 1 is advantageously ready to absorb recuperated braking energy, and the capacitor storage devices $C_1, C_2 \ldots C_N$ are, therefore, held at a low operating voltage. Slow speeds frequently indicate stopping and restarting. When the vehicle falls below a specific threshold speed, the operating voltage is advantageously set to a value close to the maximum permissible voltage at the momentary temperature so that there is energy available to start the internal combustion engine 10 and/or accelerate.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A system for storing electrical energy comprising:
   a storage module including a first capacitor connected in series with a second capacitor;
   a sensor to sense a temperature associated with the capacitor;
   a controller in communication with the sensor to control an input maximum charging voltage at the capacitor so that a maximum voltage associated with at least one of the storage module and the capacitor increases as the temperature sensed by the sensor decreases; and
   a balancing circuit including a first load resistor and a first controlled switch in circuit with the first capacitor, and a second load resistor and a second controlled switch in circuit with the second capacitor, wherein the first capacitor has a first voltage and the second capacitor has a second voltage, and a difference between the first and second voltages is compensated by controlling at least one of the first and second switches to respectively connect at least one of the first and second load resistors to at least one of the first and second capacitors to at least partially discharge the at least one of the first and second capacitors, respectively.

2. A system as defined in claim 1 further comprising a temperature-sensitive switching element to switch the first controlled switch when a specific temperature is exceeded.

3. A system as defined in claim 2 wherein the temperature-sensitive switching element comprises an NTC resistor.

4. A system as defined in claim 1 wherein the first controlled switch is temperature sensitive and switches when a specific temperature is exceeded.

5. A system as defined in claim 4 wherein the first controlled switch comprises a temperature-dependent diode.

* * * * *